(12) United States Patent
Suzuki et al.

(10) Patent No.: US 12,097,907 B2
(45) Date of Patent: Sep. 24, 2024

(54) STEERING DEVICE (71) Applicant: Hitachi Astemo, Ltd., Hitachinaka (JP)

(72) Inventors: Toshinobu Suzuki, Hitachinaka (JP); Osamu Yoshida, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/044,330

(22) PCT Filed: Aug. 10, 2021

(86) PCT No.: PCT/JP2021/029469
§ 371 (c)(1),
(2) Date: Mar. 7, 2023

(87) PCT Pub. No.: WO2022/059384
PCT Pub. Date: Mar. 24, 2022

(65) Prior Publication Data
US 2023/0331288 A1  Oct. 19, 2023

(30) Foreign Application Priority Data
Sep. 17, 2020 (JP) .................................. 2020-156060

(51) Int. Cl.
*B62D 3/12* (2006.01)
*F16H 19/04* (2006.01)
(Continued)

(52) U.S. Cl.
CPC ............. *B62D 3/126* (2013.01); *F16H 19/04* (2013.01); *F16H 55/26* (2013.01); *F16H 57/032* (2013.01); *F16H 2057/02082* (2013.01)

(58) Field of Classification Search
CPC ............ B62D 3/12; B62D 3/126; F16H 55/26; F16H 19/04
See application file for complete search history.

(56) References Cited

U.S. PATENT DOCUMENTS 9,744,985 B2 * 8/2017 Ryu ........................ F16H 55/26
11,192,574 B2 * 12/2021 Kitamura ................. B62D 3/12

FOREIGN PATENT DOCUMENTS

| JP | 2015-182713 A | 10/2015 |
| JP | 2017-007420 A | 1/2017 |
| JP | 2019077250 A * | 5/2019 |

OTHER PUBLICATIONS

International Search Report dated Sep. 21, 2021 issued in International Application No. PCT/JP2021/029469, with English translation, 5 pages.

(Continued)

*Primary Examiner* — Gregory Robert Weber
(74) *Attorney, Agent, or Firm* — Foley & Lardner LLP (57) ABSTRACT

A steering device includes: a steering shaft structured to receive rotational force; a rack bar in engagement with the steering shaft; and a rack housing that is made of a metal and contains the rack bar such that the rack bar is movable. The rack housing includes a tubular section extending in a movable direction of the rack bar, and includes a first inclination section disposed in an axial end of the tubular section and inclined to go away from the rack bar outwardly in a radial direction with respect to the rack bar. The tubular section is structured to contact with the rack bar in response to warping of the rack bar due to input from outside. The first inclination section is structured to contact with the rack bar later than the tubular section in response to warping of the rack bar due to input from outside.

13 Claims, 8 Drawing Sheets

(51) Int. Cl.
*F16H 55/26* (2006.01)
*F16H 57/032* (2012.01)
*F16H 57/02* (2012.01)

(56) References Cited

OTHER PUBLICATIONS

Written Opinion dated Sep. 21, 2021 issued in International Application No. PCT/JP2021/029469, with English translation, 10 pages.

* cited by examiner

STEERING DEVICE

TECHNICAL FIELD

The present invention relates to a steering device.

BACKGROUND ART

Patent Document 1 below discloses a steering device.

The steering device of Patent Document 1 includes a tubular rack housing that contains a rack bar movably. The rack housing includes a tubular section extending in a movable direction of the rack bar. The tubular section includes an axial end including an inner periphery including a corner that radially faces an outer periphery of the rack bar.

PRIOR ART DOCUMENT(S)

Patent Document(s)

Patent Document 1: JP 2015-182713 A

SUMMARY OF THE INVENTION

Problem(s) to be Solved by the Invention

The steering device of Patent Document 1 may undergo a problem in case that the rack bar warps due to input from a road surface. Specifically, the outer periphery of the rack bar may contact with the corner of the tubular section of the rack housing depending on an amount of the warping. This contact may cause an excessive stress to be exerted on the corner of the tubular section, and may damage the corner.

In view of the foregoing conventional circumstances, the present invention serves to provide a steering device structured to suppress an inner periphery of a rack housing from being damaged.

Means for Solving the Problem(s)

According to one aspect of the present invention, a rack housing includes a first inclination section disposed in an axial end of a tubular section and inclined to go away from a rack bar outwardly in a radial direction with respect to the rack bar. The first inclination section is structured to contact with the rack bar later than the tubular section in response to warping of the rack bar due to input from outside.

Effect(s) of the Invention

The present invention serves to suppress an inner periphery of a rack housing from being damaged.

MODE(S) FOR CARRYING OUT THE INVENTION

The following describes embodiments of a steering device according to the present invention, with reference to the drawings.

Figure 1:
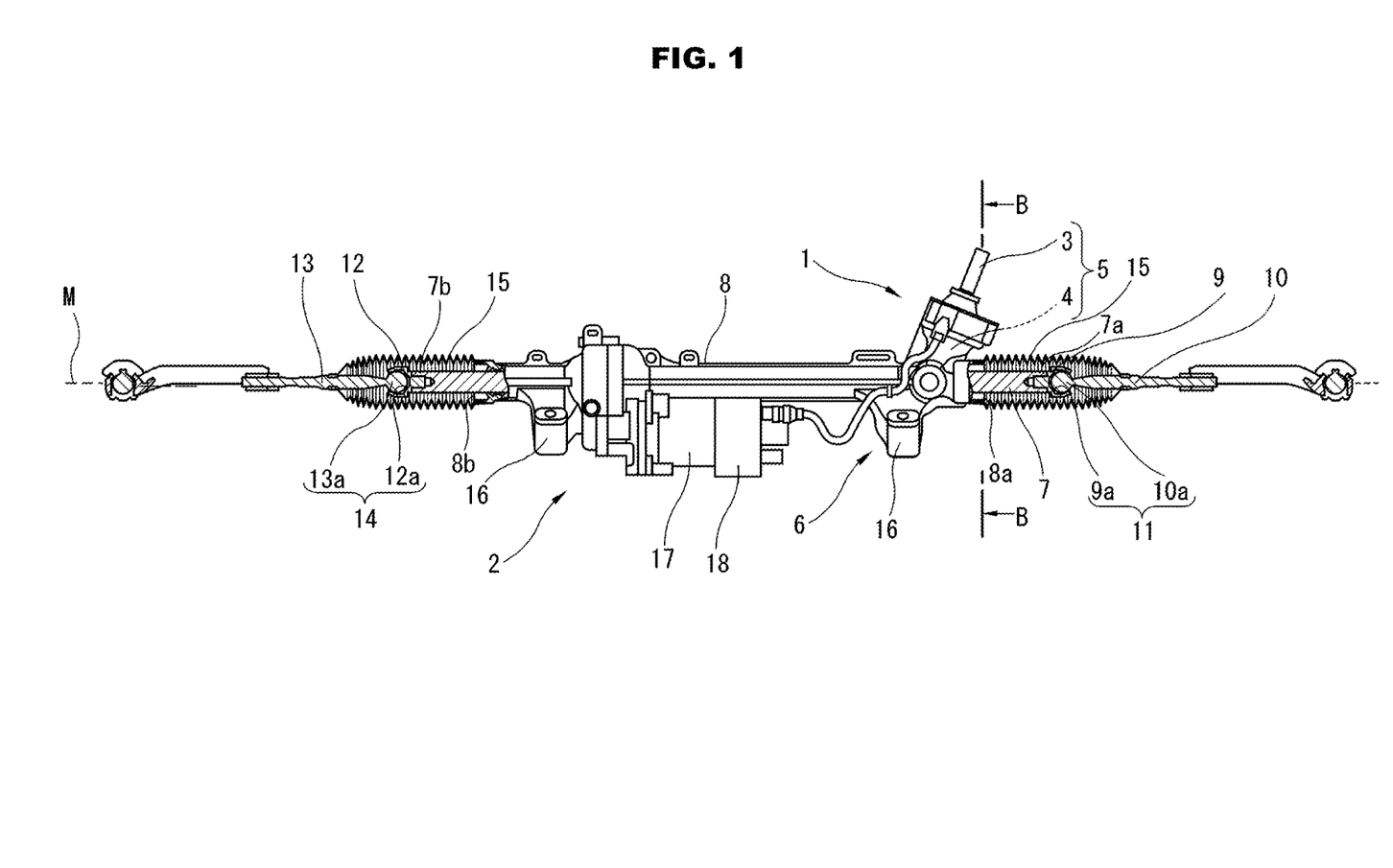
FIG. 1 is a schematic view of a steering device according to a first embodiment.

First Embodiment (Configurations of Steering Device) FIG. 1 is a schematic view of a steering device according to the first embodiment, in which a part of the steering device (specifically, sections outside rack ends) is shown as a longitudinal sectional view.

As shown in FIG. 1, the steering device includes a steering mechanism 1 and a steering assistance mechanism 2. Steering mechanism 1 transmits steering force from a driver. Steering assistance mechanism 2 assists steering operation of the driver.

Steering mechanism 1 mechanically connects a steering wheel (not shown) in a driving cabin to a pair of turning wheels (not shown) serving as front wheels of a vehicle. Steering mechanism 1 includes a steering shaft 5 and a transmission mechanism 6. Steering shaft 5 includes an input shaft 3 structured to receive rotational force from the steering wheel and an output shaft 4 connected to input shaft 3 via a torsion bar not shown. Transmission mechanism 6 transmits rotation of steering shaft 5 to the turning wheels. Transmission mechanism 6 is composed of a rack and pinion mechanism (i.e., a rack and pinion gear) including rack teeth 20 (described below) disposed in an outer periphery of a rack bar 7 and a pinion (not shown) disposed in an outer periphery of output shaft 4.

Rack bar 7 is made of a metal, and has a cylindrical shape, and is movably contained in a rack housing 8 having a thin tubular shape.

Rack bar 7 includes a first end 7a facing steering mechanism 1 and including an internal screw. The internal screw of first end 7a engages with an external screw of a first rack end 9, which fixes first rack end 9 to first end 7a. Adjacently to first end 7a of rack bar 7, first rack end 9 includes a concavity 9a depressed in an arc shape and structured to fit with a spherical end 10a of a first tie rod 10. This combination of concavity 9a and spherical end 10a composes a first ball joint 11. Rack bar 7 and first tie rod 10 are connected to each other via first ball joint 11.

Similarly, rack bar 7 includes a second end 7b facing oppositely to steering mechanism 1 and including an internal screw. The internal screw of second end 7b engages with an external screw of a second rack end 12, which fixes second rack end 12 to second end 7b. Adjacently to second end 7b of rack bar 7, second rack end 12 includes a concavity 12a depressed in an arc shape and structured to fit with a spherical end 13a of a second tie rod 13. This combination of concavity 12a and spherical end 13a composes a second ball joint 14. Rack bar 7 and second tie rod 13 are connected to each other via second ball joint 14. Each of first tie rod 10 and second tie rod 13 are connected to a corresponding one of the turning wheels via a knuckle arm not shown.

Rack housing 8 is made of a metal such as an aluminum, and is formed by die-casting. Rack housing 8 includes a pair of axial ends 8a and 8b each of which may include a shock absorber (not shown) structured to absorb a shock caused due to collision between rack housing 8 and first rack end 9 and/or collision between rack housing 8 and second rack end 12.

Axial ends 8a and 8b of rack housing 8 are respectively provided with boots 15, 15 each of which has a bellows shape and covers an outer periphery of a corresponding one of first ball joint 11 and second ball joint 14. Each boot 15 is made of an elastic material such as a synthetic rubber, and is formed to have predetermined flexibility so as to prevent intrusion of water, dust, etc. into rack housing 8.

Each of axial ends 8a and 8b of rack housing 8 is accompanied by a mount bracket 16 in a vicinity thereof for mounting rack housing 8 to a vehicle body. Each mount bracket 16 includes a rubber bush (not shown) via which rack housing 8 is mounted to the vehicle body.

Steering assistance mechanism 2 includes a motor 17 that is an electric motor structured to provide steering force for steering mechanism 1. Motor 17 is integrated with an electronic control unit (ECU) 18. Electronic control unit 18 is configured to store and execute various control processes, and controls driving of motor 17 with reference to signals such as a steering torque signal outputted from a torque sensor not shown.

According to these configurations of the steering device, rotational operation on the steering wheel by a driver rotates input shaft 3 and thereby twists the torsion bar to generate an elastic force to rotate output shaft 4. The rotational motion of output shaft 4 is converted to an axial linear motion of rack bar 7 by the rack and pinion mechanism. This linear motion pushes and pulls the knuckle arms (not shown) in a vehicle width direction via first tie rod 10 and second tie rod 13, and thereby changes directions of the corresponding turning wheels.

Figure 2A:
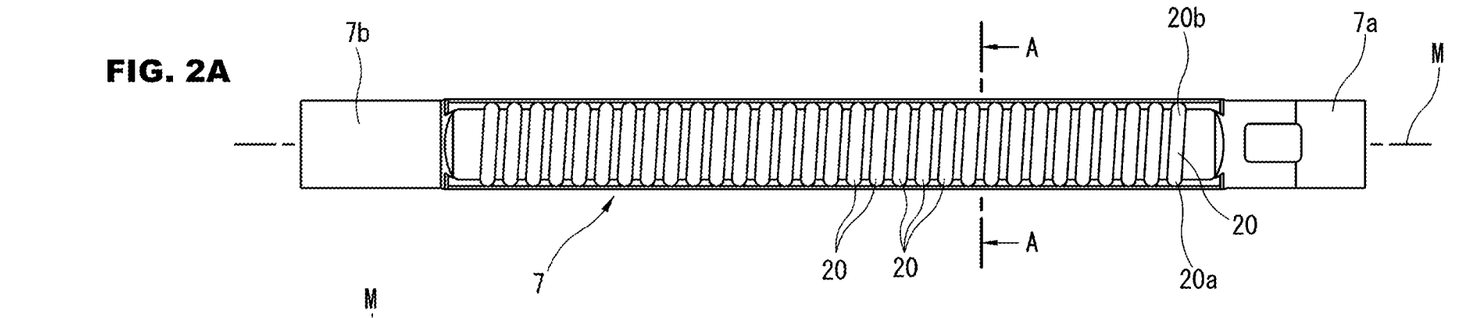
FIG. 2A is a plan view of a rack bar.
Figure 2B:
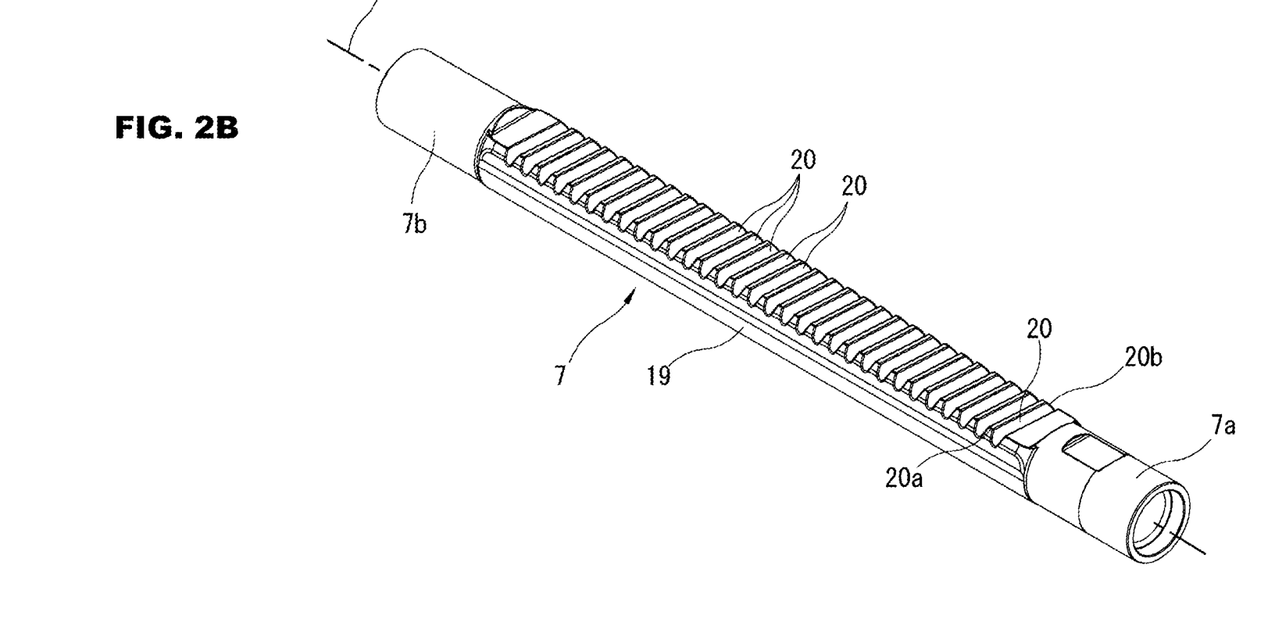
FIG. 2B is a perspective view of the rack bar.
Figure 3:
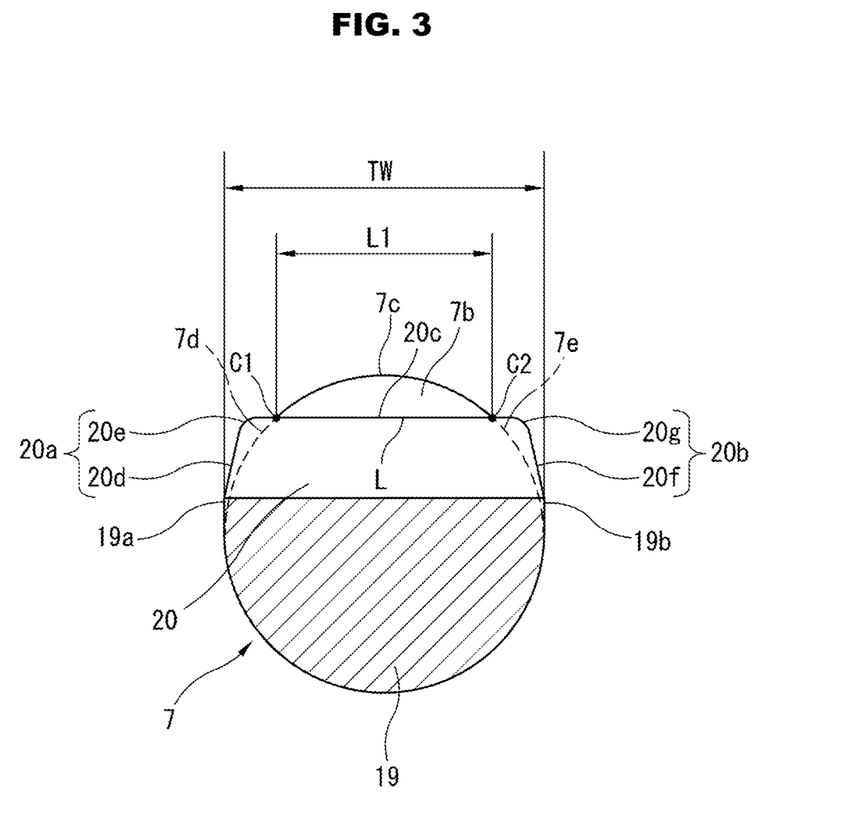
FIG. 3 is a cross sectional view of the rack bar along a line A-A shown in FIG. 2A.

FIG. 2A is a plan view of rack bar 7. FIG. 2B is a perspective view of rack bar 7. FIG. 3 is a cross sectional view of rack bar 7 along a line A-A shown in FIG. 2A.

Reference axial line M is a center line of rack bar 7. Then, a direction parallel with reference axial line M and identical to a movable direction of rack bar 7 is referred to as the axial direction. A direction orthogonal to reference axial line M is referred to as a radial direction with respect to reference axial line M. A direction around reference axial line M is referred to as a circumferential direction.

Rack bar 7 is an integrated member made of a metal, and includes a rack body 19, rack teeth 20, and first end 7a and second end 7b. Rack body 19 has a substantially semicylindrical shape, and is formed to occupy a circumferential region opposite to output shaft 4 across reference axial line M. Rack teeth 20 are integrated with rack body 19, and are formed to occupy a circumferential region facing output shaft 4. Each of first end 7a and second end 7b has a cylindrical shape, and is integrated with rack body 19 at a corresponding one of axial ends of rack body 19.

As shown in FIG. 3, rack body 19 has a substantially semicircular shape when viewed in the axial direction, and includes an outer edge 19a and an outer edge 19b. Outer edge 19a and outer edge 19b are respectively positioned in a circumferential first end and a circumferential second end of an outer periphery of rack body 19 continuous in an arc shape. Although FIG. 3 shows an example of rack body 19 shaped substantially semicircular when viewed in the axial direction, rack body 19 is not limited to such embodiment.

Rack teeth 20 are thirty one in number according to the present embodiment, and are formed by deforming, by forging, a circumferential region in the outer periphery of rack bar 7 within an axial range excluding first end 7a and second end 7b. As shown in FIGS. 2A and 2B, rack teeth 20 are arranged at equal intervals in the axial direction, within an axial region between first end 7a and second end 7b. Furthermore, as shown in FIG. 2A, rack teeth 20 are slightly inclined toward first end 7a with respect to reference axial line M. In other words, each of rack teeth 20 is inclined to include a tooth-width-direction first end 20a and a tooth-width-direction second end 20b positioned slightly nearer to first end 7a than tooth-width-direction first end 20a.

As shown in FIG. 3, each of rack teeth 20 has a substantially trapezoidal shape when viewed in the axial direction, and includes tooth-width-direction first end 20a and tooth-width-direction second end 20b as ends in a tooth width direction of rack teeth 20.

As shown in FIG. 3, tooth-width-direction first end 20a includes a first sloped surface 20d and a first arc-shaped surface 20e. First sloped surface 20d is inwardly inclined from first outer edge 19a of rack body 19 toward a tooth top 20c. First arc-shaped surface 20e is an arc-shaped surface connecting an end of first sloped surface 20d to a first end of tooth top 20c. As shown in FIG. 3, first sloped surface 20d and first arc-shaped surface 20e are positioned outer in the radial direction, with respect to an outer periphery of second end 7b. The outer periphery of second end 7b is partially shown as an arc solid line 7c and arc broken lines 7d and 7e.

Tooth-width-direction second end 20b includes a second sloped surface 20f and a second arc-shaped surface 20g. Second sloped surface 20f has a shape similar to first sloped surface 20d, and is inwardly inclined from second outer edge 19b of rack body 19 toward tooth top 20c. Second arc-shaped surface 20g has a shape similar to first arc-shaped surface 20e, and is an arc-shaped surface connecting an end of second sloped surface 20f to a second end of tooth top 20c. As shown in FIG. 3, second sloped surface 20f and second arc-shaped surface 20g are positioned outer in the radial direction, with respect to the outer periphery of second end 7b described above.

As shown in FIG. 3, each of rack teeth 20 has a tooth width (i.e., a maximum tooth width) TW longer than a length L1 of a line segment L and equal to or shorter than a diameter of rack bar 7, where line segment L is a line segment connecting two intersection points C1 and C2 that are intersection points of the outer periphery of second end 7b and tooth top 20c of the each of rack teeth 20 when viewed in the axial direction. According to the present embodiment, tooth width TW is substantially equal to the diameter of rack bar 7.

Figure 4:
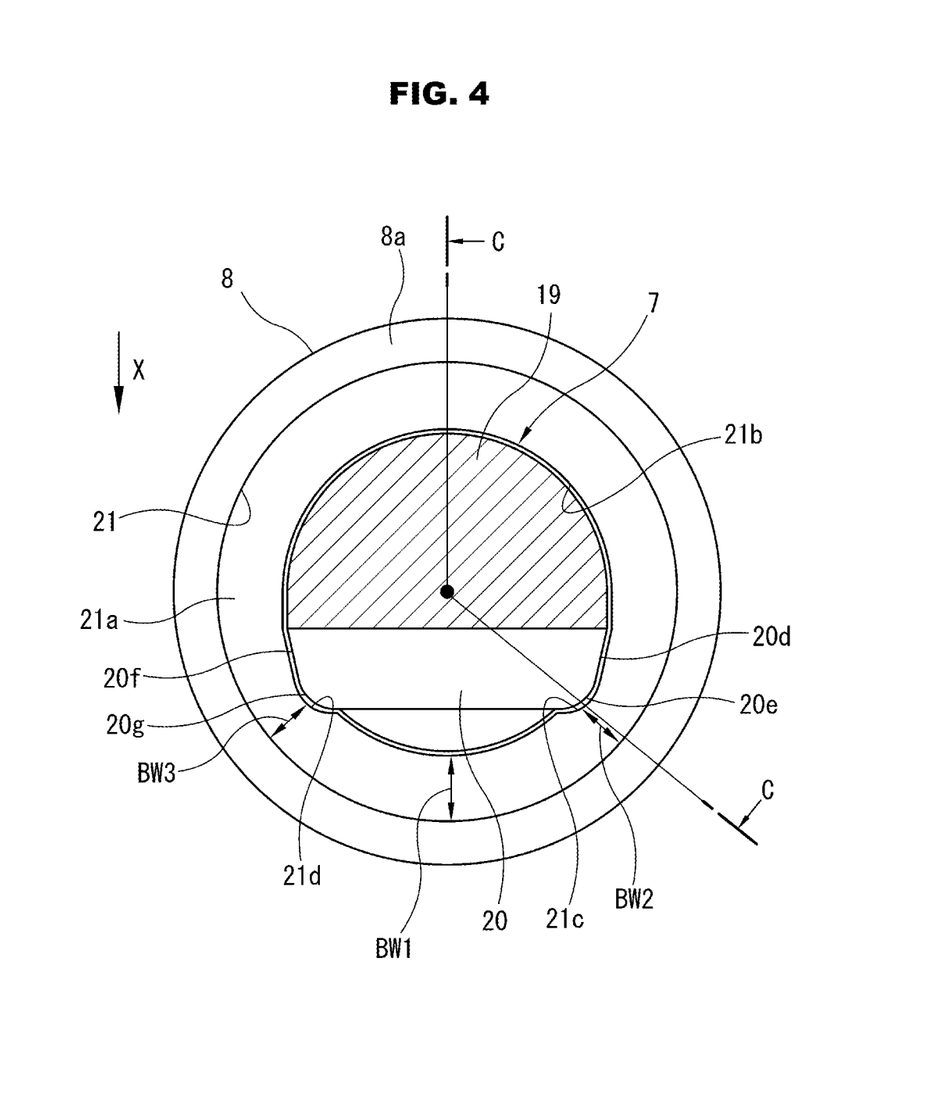
FIG. 4 is a cross sectional view of the rack bar inside a rack housing, along a line B-B shown in FIG. 1.

FIG. 4 is a cross sectional view of rack bar 7 contained in rack housing 8, along a line B-B shown in FIG. 1. FIG. 4 simplifies an outer periphery of rack housing 8 for clarity of the drawing.

Rack housing 8 includes a rack-bar-containing through hole 21b and a pair of step sections 21. Rack-bar-containing through hole 21b is disposed in a central part of rack housing 8, and has a shape corresponding to an outline of rack bar 7. Each of step sections 21 is disposed in a corresponding one of axial ends of rack-bar-containing through hole 21b, and has a stepwise shape increasing in diameter as going outwardly in the axial direction.

Rack-bar-containing through hole 21b includes an inner peripheral surface including a first contact surface 21c and a second contact surface 21d. First contact surface 21c has an arc shape, and is positioned to face first arc-shaped surfaces 20e of rack teeth 20, and is structured to contact with first arc-shaped surfaces 20e in case that rack bar 7 warps in a direction X from rack body 19 toward rack teeth 20 due to input from outside such as a road surface. Similarly, second contact surface 21d has an arc shape, and is positioned to face second arc-shaped surfaces 20g of rack teeth 20, and is structured to contact with second arc-shaped surfaces 20g in case that rack bar 7 warps in direction X due to input from outside. First contact surface 21c and second contact surface 21d are greater in radius of curvature than first arc-shaped surfaces 20e and second arc-shaped surfaces 20g.

Step section 21 facing first rack end 9 has an inner diameter sufficient to accept first rack end 9, and includes a bottom surface 21a serving as a regulation surface that regulates axial movement of first ball joint 11 (see FIG. 1). Regarding radial width, bottom surface 21a is formed such that a radial width BW1 in a region including neither first contact surface 21c nor second contact surface 21d is greater than a radial width BW2 in a region including first contact surface 21c and greater than a radial width BW3 in a region including second contact surface 21d.

The regulation of movement of first ball joint 11 may be directly performed by bottom surface 21a of step section 21, or may be indirectly performed by a buffer (not shown) structured to contact with bottom surface 21a.

Figure 5:
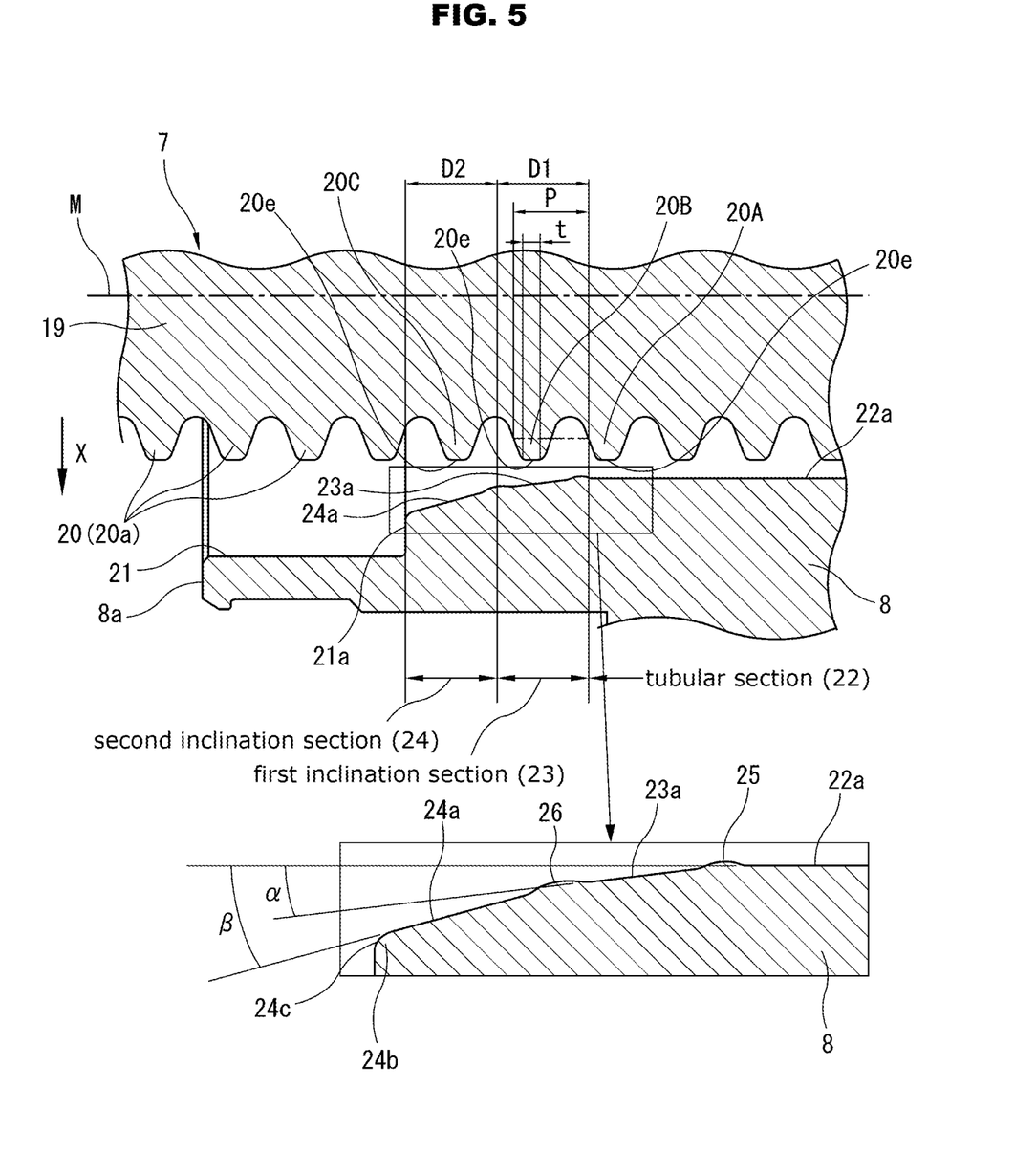
FIG. 5 is a longitudinal sectional view of the rack bar and the rack housing along a line C-C shown in FIG. 4.

FIG. 5 is a longitudinal sectional view of rack bar 7 and rack housing 8 along a line C-C shown in FIG. 4. For convenience of explanation, FIG. 5 shows a first inclination angle α and a second inclination angle β with exaggeration to be greater than actual angles.

Rack housing 8 includes a tubular section 22, a pair of first inclination sections 23, and a pair of second inclination sections 24. Tubular section 22 has a cylindrical tubular shape, and extends in the axial direction. Each of first inclination sections 23 is disposed adjacently to an axial first end of tubular section 22. Each of second inclination sections 24 is connected to an axial first end of a corresponding one of first inclination sections 23.

FIG. 5 shows a first rack tooth 20A, a second rack tooth 20B, and a third rack tooth 20C of rack teeth 20. First rack tooth 20A refers to, out of rack teeth 20 facing tubular section 22, a rack tooth facing ends of inner peripheral surfaces 22a of tubular section 22 adjacent to first inclination sections 23. Second rack tooth 20B refers to a rack tooth facing first inclination sections 23 in the radial direction. Third rack tooth 20C refers to a rack tooth facing second inclination sections 24 in the radial direction.

Tubular section 22, first inclination sections 23, and second inclination sections 24 are structured to distribute stresses exerted from first rack tooth 20A, second rack tooth 20B, and third rack tooth 20C in stages, in case that rack bar 7 warps in direction X due to input from a road surface. Specifically, tubular section 22, first inclination sections 23, and second inclination sections 24 are structured such that, in response to warping of rack bar 7 in direction X, first, first rack tooth 20A contacts with tubular section 22, and next, second rack tooth 20B contacts with first inclination sections 23, and last, third rack tooth 20C contacts with second inclination sections 24.

Tubular section 22 is positioned axially centrally in rack housing 8, and extends in the axial direction. Tubular section 22 includes a pair of inner peripheral surfaces 22a formed by machining cast surfaces. Each of inner peripheral surfaces 22a spreads in the axial direction, and is disposed in a corresponding one of first contact surface 21c and second contact surface 21d (see FIG. 4).

Each of the pair of first inclination sections 23 includes a first inclination inner peripheral surface 23a. Each of first inclination inner peripheral surfaces 23a is inclined to go away from rack bar 7 outwardly in the radial direction, as going outwardly in the axial direction (i.e., as approaching axial first end 8a). In other words, each of first inclination inner peripheral surfaces 23a is inclined to increase in radial distance from reference axial line M to a corresponding one of first inclination sections 23, as going outwardly in the axial direction. Each of first inclination inner peripheral surfaces 23a is a cast surface formed during die-casting of rack housing 8, and is disposed in a corresponding one of first contact surface 21c and second contact surface 21d (see FIG. 4). Each of first inclination inner peripheral surfaces 23a is inclined at first inclination angle α outwardly in the axial direction, where first inclination angle α is an inferior angle out of angles defined between the each of first inclination inner peripheral surfaces 23a and a corresponding one of inner peripheral surfaces 22a of tubular section 22 spreading in the axial direction. First inclination angle α is set to an angle that allows first arc-shaped surface 20e and second arc-shaped surface 20g (see FIG. 4) of second rack tooth 20B to contact with first inclination inner peripheral surfaces 23a after first arc-shaped surface 20e and second arc-shaped surface 20g of first rack tooth 20A has contacted with inner peripheral surfaces 22a of tubular section 22, in case of warping of rack bar 7 in direction X within an elastic deformation region due to input from a road surface. According to the present embodiment, first inclination angle α is set to 7°.

As shown in FIG. 5, each of first inclination inner peripheral surfaces 23a is smoothly connected to a corresponding one of inner peripheral surfaces 22a via a first arc surface 25 that has an arc shape convex toward rack bar 7 when viewed at a longitudinal section in the axial direction.

Each of the pair of second inclination sections 24 includes a second inclination inner peripheral surface 24a that is inclined to go away from rack bar 7 outwardly in the radial direction at second inclination angle β greater than first inclination angle α of first inclination sections 23. Second inclination angle β is set to an angle that allows first arc-shaped surface 20e and second arc-shaped surface 20g (see FIG. 4) of third rack tooth 20C to contact with second inclination inner peripheral surfaces 24a after first arc-shaped surface 20e and second arc-shaped surface 20g of second rack tooth 20B has contacted with first inclination inner peripheral surfaces 23a, in case of warping of rack bar 7 in direction X within the elastic deformation region due to input from a road surface. According to the present embodiment, second inclination angle β is set to 11°. Each of second inclination inner peripheral surfaces 24a is a cast surface formed during-die casting of rack housing 8, and is disposed in a corresponding one of first contact surface 21c and second contact surface 21d (see FIG. 4).

As shown in FIG. 5, each of second inclination inner peripheral surfaces 24a is smoothly connected to a corresponding one of first inclination inner peripheral surfaces 23a via a second arc surface 26 that has an arc shape convex toward rack bar 7 when viewed at a longitudinal section in the axial direction. Furthermore, each of second inclination sections 24 includes a corner 24b between bottom surface 21a of step section 21 and a corresponding one of second inclination inner peripheral surfaces 24a. Each of corners 24b includes a round chamfering part 24c curved to form an arc-shaped surface.

Rack teeth 20 are arranged at a pitch P shorter than an axial width D1 of first inclination inner peripheral surfaces 23a and shorter than an axial width D2 of second inclination inner peripheral surfaces 24a, which is illustrated with a part including second rack tooth 20B as an example in the present embodiment. As shown in FIG. 5, the configuration of setting pitch P shorter than axial widths D1 and D2 causes each of first arc-shaped surfaces 20e to have a tooth thickness t smaller than axial width D1 and axial width D2, and facilitates contact of second rack tooth 20B and third rack tooth 20C with first inclination inner peripheral surfaces 23a and second inclination inner peripheral surfaces 24a.

Figure 6A:
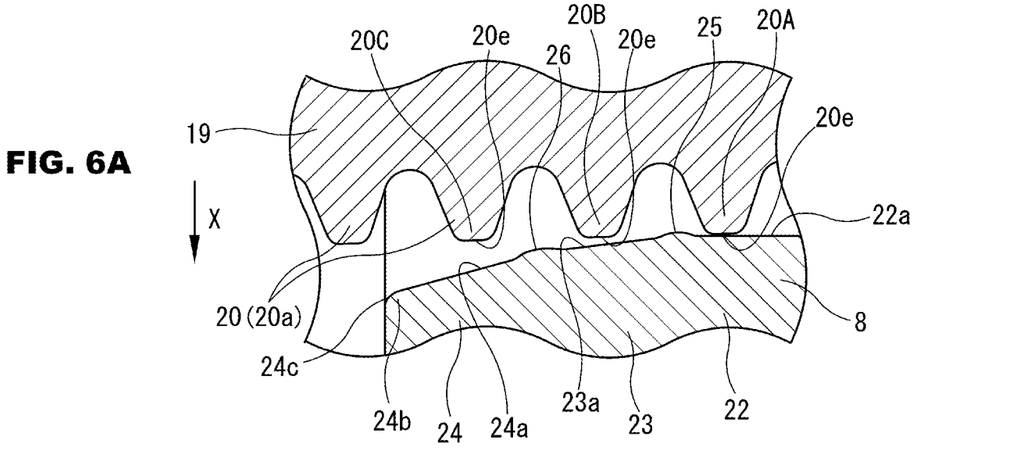
FIG. 6A is a longitudinal sectional view of the rack bar and the rack housing when the rack bar has started to warp in a direction of an arrow X.
Figure 6B:
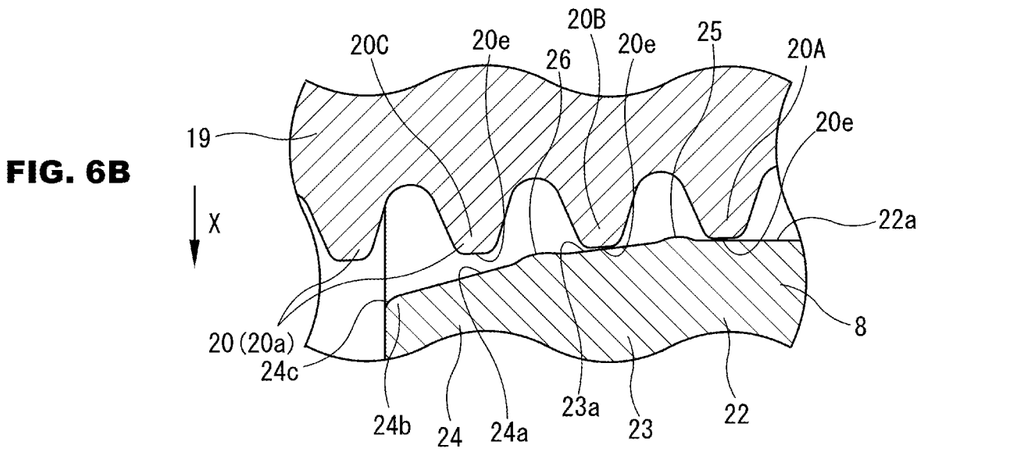
FIG. 6B is a longitudinal sectional view of the rack bar and the rack housing when the rack bar has warped in the direction of the arrow X further from a state of FIG. 6A.
Figure 6C:
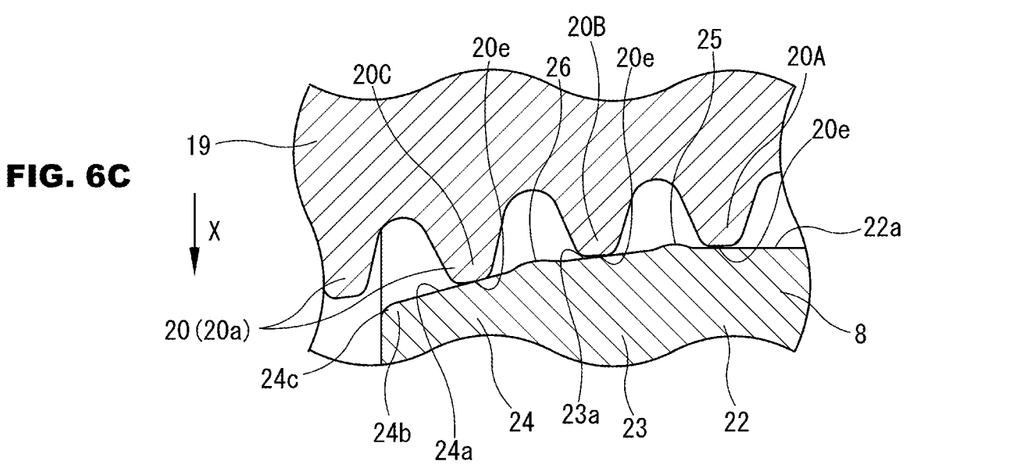
FIG. 6C is a longitudinal sectional view of the rack bar and the rack housing when the rack bar has warped in the direction of the arrow X further from a state of FIG. 6B.

FIG. 6A is a longitudinal sectional view of rack bar 7 and rack housing 8 when rack bar 7 has started to warp in the direction of arrow X. FIG. 6B is a longitudinal sectional view of rack bar 7 and rack housing 8 when rack bar 7 has warped in the direction of arrow X further from a state of FIG. 6A. FIG. 6C is a longitudinal sectional view of rack bar 7 and rack housing 8 when rack bar 7 has warped in the direction of arrow X further from a state of FIG. 6B. In response to warping of rack bar 7 in the direction of arrow X, tooth-width-direction first ends 20a and tooth-width-direction second ends 20b of first rack tooth 20A, second rack tooth 20B, and third rack tooth 20C respectively contact with tubular section 22, first inclination sections 23, and second inclination sections 24. As a representative example, the present embodiment explains only contact of tooth-width-direction first ends 20a.

As shown in FIG. 6A, when rack bar 7 has started to warp in the direction of arrow X due to input from a road surface, first arc-shaped surface 20e of tooth-width-direction first end 20a of first rack tooth 20A contacts with inner peripheral surface 22a of tubular section 22.

After the contact of first arc-shaped surface 20e with inner peripheral surface 22a, when rack bar 7 has further warped in the direction of arrow X as shown in FIG. 6B, first arc-shaped surface 20e of tooth-width-direction first end 20a of second rack tooth 20B contacts with first inclination inner peripheral surface 23a of first inclination section 23. On this occasion, first arc-shaped surface 20e of second rack tooth 20B contacts with first inclination inner peripheral surface 23a, with first arc-shaped surface 20e of first rack tooth 20A being in contact with inner peripheral surface 22a. This distributes a stress exerted on rack housing 8 from rack bar 7, to inner peripheral surfaces 22a and first inclination inner peripheral surfaces 23a.

After the contact of first arc-shaped surface 20e with first inclination inner peripheral surface 23a, when rack bar 7 has further warped in the direction of arrow X as shown in FIG. 6C, first arc-shaped surface 20e of tooth-width-direction first end 20a of third rack tooth 20C contacts with second inclination inner peripheral surface 24a of second inclination section 24. On this occasion, first arc-shaped surface 20e of third rack tooth 20C contacts with second inclination inner peripheral surface 24a, with first arc-shaped surface 20e of first rack tooth 20A being in contact with inner peripheral surface 22a and with first arc-shaped surface 20e of second rack tooth 20B being in contact with first inclination inner peripheral surface 23a. This distributes the stress exerted on rack housing 8 from rack bar 7, to inner peripheral surfaces 22a, first inclination inner peripheral surfaces 23a, and second inclination inner peripheral surfaces 24a.

The present embodiment shows an example of forming inner peripheral surfaces 22a, first inclination inner peripheral surfaces 23a, and second inclination inner peripheral surfaces 24a in axial first end 8a of rack housing 8. This may be modified to form inner peripheral surfaces 22a, first inclination inner peripheral surfaces 23a, and second inclination inner peripheral surfaces 24a in an axial second end 8b of rack housing 8.

Effects of First Embodiment

Figure 7:
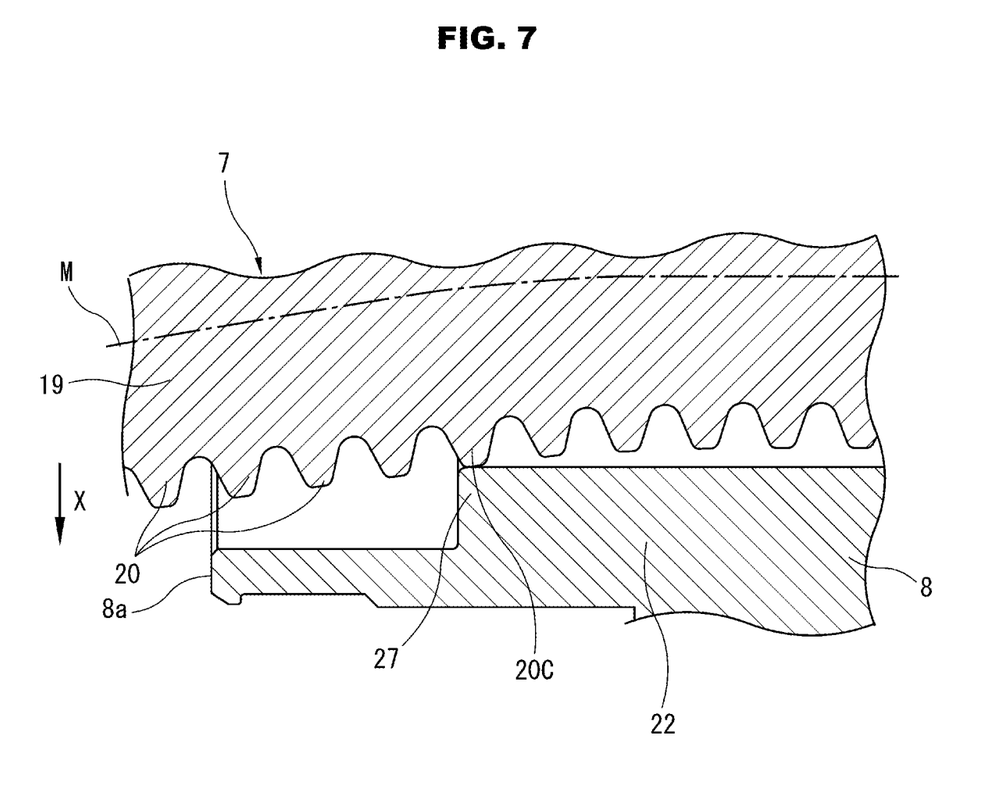
FIG. 7 is a longitudinal sectional view of a rack bar and a rack housing according to a conventional art.

FIG. 7 is a longitudinal sectional view of a rack bar 7 and a rack housing 8 according to a conventional art.

The steering device according to the conventional art does not include members equivalent to first inclination sections 23 and second inclination sections 24 of the present embodiment, and includes a corner 27 in an inner periphery of the axial first end of tubular section 22 of rack housing 8.

As shown in FIG. 7, corner 27 of tubular section 22 excessively contacts with third rack tooth 20C in response to warping of rack bar 7 in the direction of arrow X due to input from a road surface. Corner 27 has a right angle when viewed at a longitudinal section in the axial direction as shown in FIG. 7, and tends to undergo concentration of stress in comparison with other portions of tubular section 22. Accordingly, corner 27 that tends to undergo concentration of stress may be damaged due to concentration of stress when corner 27 receives an excessive stress due to contact with third rack tooth 20C.

Furthermore, if corner 27 having been damaged is caught into an engagement part of the rack and pinion through an interior of tubular section 22, rack bar 7 may be locked and suppressed from smoothly moving.

On the other hand, the present embodiment is configured such that first inclination inner peripheral surfaces 23a of first inclination sections 23 contact with second rack tooth 20B later than contact of first rack tooth 20A with inner peripheral surfaces 22a of tubular section 22 in response to warping of rack bar 7 in the direction of arrow X due to input from a road surface. This distributes the stress exerted on rack housing 8 from rack bar 7, to inner peripheral surfaces 22a and first inclination inner peripheral surfaces 23a. In detail, inner peripheral surfaces 22a absorb the stress exerted on rack housing 8 from rack bar 7, and then first inclination inner peripheral surfaces 23a receive less stresses. This suppresses the inner peripheral surfaces of rack housing 8 from being damaged in comparison with a case that excessive stresses are directly exerted on only inner peripheral surfaces 22a.

The suppression of damaging first inclination inner peripheral surfaces 23a suppresses the engagement part of the rack and pinion from catching a part of first inclination inner peripheral surfaces 23a having been damaged. This avoids the locking of rack bar 7 due to the catching of damaged corner 27 in the conventional art, and serves to allow rack bar 7 to smoothly move.

Furthermore, the configuration of receiving the stress from rack bar 7 with inner peripheral surfaces 22a and first inclination inner peripheral surfaces 23a shortens a distance from a connection point of first tie rod 10 and rack bar 7 to contact points of rack bar 7 and rack housing 8, in comparison with a case of receiving the stress with only inner peripheral surfaces 22a. In detail, a distance from the connection point of first tie rod 10 and rack bar 7 to contact points of second rack tooth 20B and first inclination inner peripheral surfaces 23a is shorter than a distance from the connection point of first tie rod 10 and rack bar 7 to contact points of first rack tooth 20A and inner peripheral surfaces 22a. Rack bar 7 receives a bending moment that is a product of the distance from the connection point of first tie rod 10 and rack bar 7 to the contact points of rack bar 7 and rack housing 8 and a force exerted in the direction of arrow X, i.e., a direction of warping of rack bar 7. Therefore, the bending moment exerted on rack bar 7 decreases with decrease in distance from the connection point of first tie rod 10 and rack bar 7 to the contact points of rack bar 7 and rack housing 8, provided that the force exerted in the direction of arrow X is constant. Thus, the configuration of receiving the stress from rack bar 7 with inner peripheral surfaces 22a and first inclination inner peripheral surfaces 23a reduces the bending moment exerted on rack bar 7, and thereby reduces a bending stress exerted on rack bar 7, in comparison with the case of receiving the stress with only inner peripheral surfaces 22a. This improves rack bar 7 in durability against contact with rack housing 8.

According to the present embodiment, each of second inclination sections 24 includes second inclination inner peripheral surface 24a that is inclined with respect to the axial direction at the inclination angle greater than that of first inclination inner peripheral surfaces 23a. Second inclination inner peripheral surfaces 24a contact with third rack tooth 20C in response to warping of rack bar 7 in the direction of arrow X due to input from a road surface. On this occasion, second inclination inner peripheral surfaces 24a contact with third rack tooth 20C in a state in which inner peripheral surfaces 22a are in contact with first rack tooth 20A and first inclination inner peripheral surfaces 23a are in contact with second rack tooth 20B. This distributes the stress exerted on rack housing 8 from rack bar 7, to inner peripheral surfaces 22a, first inclination inner peripheral surfaces 23a, and second inclination inner peripheral surfaces 24a. This suppresses the inner peripheral surfaces of rack housing 8 from being damaged, more effectively than a case of receiving the stress with inner peripheral surfaces 22a and first inclination inner peripheral surfaces 23a.

Furthermore, the configuration of receiving the stress from rack bar 7 with inner peripheral surfaces 22a, first inclination inner peripheral surfaces 23a, and second inclination inner peripheral surfaces 24a shortens the distance from the connection point of first tie rod 10 and rack bar 7 to the contact points of rack bar 7 and rack housing 8, in comparison with receiving the stress with inner peripheral surfaces 22a and first inclination inner peripheral surfaces 23a. In detail, a distance from the connection point of first tie rod 10 and rack bar 7 to contact points of third rack tooth 20C and second inclination inner peripheral surfaces 24a is shorter than the distance from the connection point of first tie rod 10 and rack bar 7 to the contact points of second rack tooth 20B and first inclination inner peripheral surfaces 23a. This further reduces the bending moment exerted on rack bar 7 and the bending stress exerted on rack bar 7, and thereby further improves rack bar 7 in durability against contact with rack housing 8.

According to the present embodiment, tooth width TW of rack teeth 20 is greater than length L1 of line segment L that connects two intersection points C1 and C2 of the outer periphery of second end 7b and tooth tops 20c of rack teeth 20 when viewed in the axial direction. The configuration of setting tooth width TW relatively wide serves to increase a number of rack teeth 20 that simultaneously engage with the pinion of output shaft 4. This reduces rack teeth 20 in load exerted thereon per tooth, and thereby improves rack teeth 20 in durability.

According to the present embodiment, inner peripheral surfaces 22a, first inclination inner peripheral surfaces 23a, and second inclination inner peripheral surfaces 24a respectively contact with tooth-width-direction first ends 20a and tooth-width-direction second ends 20b of first rack tooth 20A, second rack tooth 20B, and third rack tooth 20C in response to warping of rack bar 7 in the direction of arrow X due to input from a road surface. This distributes the stress exerted on rack housing 8 from rack bar 7, to two sides of tooth-width-direction first ends 20a and tooth-width-direction second ends 20b. This suppresses the stress from rack bar 7 from concentrating in a specific region of rack housing 8, in comparison with receiving the stress with one side. This further suppresses inner peripheral surfaces 22a, first inclination inner peripheral surfaces 23a, and second inclination inner peripheral surfaces 24a of rack housing 8 from being damaged.

According to the present embodiment, the radial width of bottom surface 21a is set such that radial width BW1 in the region excluding first contact surface 21c and second contact surface 21d is greater than radial width BW2 in the region including first contact surface 21c and radial width BW3 in the region including second contact surface 21d. In other words, bottom surface 21a being the regulation surface spreading in the radial direction of rack bar 7 is set in width such that radial width BW1 in the region excluding second inclination sections 24 is greater than radial width BW2 in the region including a corresponding one of second inclination sections 24 and radial width BW3 in the region including another corresponding one of second inclination sections 24. The configuration of forming bottom surface 21a to widen radial width BW1 in the region excluding second inclination sections 24 serves to increase bottom surface 21a in area for receiving a pressure upon collision with first rack end 9 connected to first end 7a of rack bar 7. This decreases an area pressure exerted on bottom surface 21a upon collision with first rack end 9, and thereby suppresses bottom surface 21a of rack housing 8 being damaged.

According to the present embodiment, each of tooth-width-direction first ends 20a and tooth-width-direction second ends 20b of rack teeth 20 is formed to be an arc-shaped surface. In other words, each of tooth-width-direction first ends 20a includes first arc-shaped surface 20e, and each of tooth-width-direction second ends 20b includes second arc-shaped surface 20g. First arc-shaped surfaces 20e contact surface-to-surface with first contact surface 21c, and second arc-shaped surfaces 20g contact surface-to-surface with second contact surface 21d. This reduces stresses exerted on first contact surface 21c and second contact surface 21d, and thereby reduces damage on rack housing 8, in comparison with a case that each of tooth-width-direction first ends 20a and tooth-width-direction second ends 20b includes a corner that contacts point-to-surface with a corresponding one of first contact surface 21c and second contact surface 21d.

According to the present embodiment, second inclination inner peripheral surfaces 24a contact with third rack tooth 20C later than contact of first inclination inner peripheral surfaces 23a, in response to warping of rack bar 7 in the direction of arrow X due to input from a road surface. In detail, second inclination inner peripheral surfaces 24a receives a less stress after inner peripheral surfaces 22a and first inclination inner peripheral surfaces 23a absorb the stress exerted on rack housing 8 from rack bar 7. This reduces stresses exerted on corners 24b in the axial first ends of second inclination inner peripheral surfaces 24a, and thereby suppresses corners 24b from being damaged, in comparison with a case that excessive stresses are directly exerted on second inclination inner peripheral surfaces 24a with neither contact between first rack tooth 20A and inner peripheral surfaces 22a nor contact between second rack tooth 20B and first inclination inner peripheral surfaces 23a.

According to the present embodiment, each of inner peripheral surfaces 22a is connected to a corresponding one of first inclination inner peripheral surfaces 23a via first arc surface 25 having the arc shape, while each of first inclination inner peripheral surfaces 23a is connected to a corresponding one of second inclination inner peripheral surfaces 24a via second arc surface 26 having the arc shape. If these connections between inner peripheral surfaces 22a, first inclination inner peripheral surfaces 23a, and second inclination inner peripheral surfaces 24a were connections via corners, second rack tooth 20B and third rack tooth 20C might be damaged due to contact with such corners. However, the present embodiment is configured to receive second rack tooth 20B and third rack tooth 20C with first arc surfaces 25 and second arc surfaces 26 that are relatively wide surfaces. This suppresses concentration of stress, and thereby suppresses the inner peripheral surfaces of rack housing 8 from being damaged due to contact with second rack tooth 20B and third rack tooth 20C.

According to the present embodiment, pitch P of rack teeth 20 is shorter than axial width D1 of first inclination inner peripheral surfaces 23a. This causes, as described above, tooth thickness t of first arc-shaped surfaces 20e to be shorter than axial width D1 of first inclination inner peripheral surfaces 23a. Accordingly, first arc-shaped surface 20e of second rack tooth 20B contacts with first inclination inner peripheral surface 23a being a wider surface, and a stress from second rack tooth 20B is certainly transmitted to first inclination inner peripheral surface 23a. This improves the distribution of stress on first inclination sections 23, and thereby reduces damage on first inclination sections 23.

According to the present embodiment, pitch P of rack teeth 20 is shorter than axial width D2 of second inclination inner peripheral surfaces 24a. Similarly to the case of first inclination inner peripheral surface 23a, first arc-shaped surface 20e of third rack tooth 20C contacts with second inclination inner peripheral surface 24a being a wider surface, and a stress from third rack tooth 20C is certainly transmitted to second inclination inner peripheral surface 24a. This improves the distribution of stress on second inclination sections 24, and thereby reduces damage on second inclination sections 24, especially on corners 24b.

According to the present embodiment, rack bar 7 contacts with second inclination inner peripheral surfaces 24a within the elastic deformation region of rack bar 7. If rack bar 7 contacted with second inclination inner peripheral surfaces 24a within a plastic deformation region of rack bar 7, rack bar 7 might contact hard with second inclination inner peripheral surfaces 24a and thereby damage second inclination inner peripheral surfaces 24a and corners 24b. In view of this, the present embodiment is configured to confine contact of rack bar 7 within the elastic deformation region, and thereby reduces damage on second inclination inner peripheral surfaces 24a etc.

According to the present embodiment, each of first inclination inner peripheral surfaces 23a has a cast surface. If first inclination inner peripheral surfaces 23a were processed by machining, such processing might form a blow hole in first inclination inner peripheral surfaces 23a. The blow hole may deteriorate first inclination inner peripheral surfaces 23a in strength. In view of this, the present embodiment configures first inclination inner peripheral surfaces 23a as cast surfaces, and thereby suppresses first inclination inner peripheral surfaces 23a from being deteriorated in strength.

Second Embodiment

Figure 8:
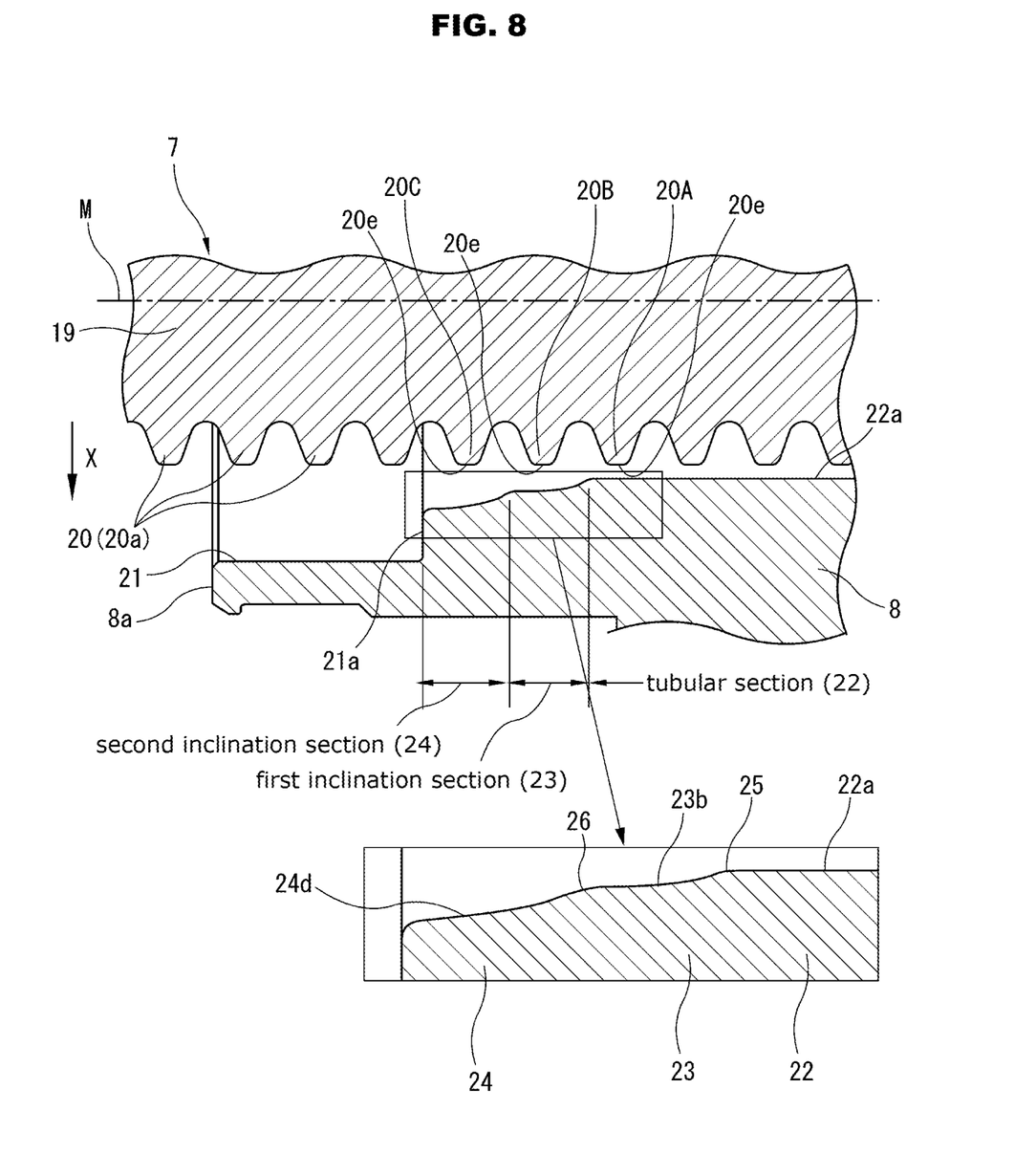
FIG. 8 is a longitudinal sectional view of a rack bar and a rack housing according to a second embodiment.

FIG. 8 is a longitudinal sectional view of rack bar 7 and rack housing 8 according to the second embodiment.

According to the second embodiment, tubular section 22, first inclination sections 23, and second inclination sections 24 curvilinearly change as going in the axial direction. Specifically, as shown in FIG. 8, inner peripheral surface 22a shaped straight is connected, via first arc surface 25, to a first inclination inner peripheral surface 23b slightly depressed in an arc shape toward first inclination section 23, and the first inclination inner peripheral surface 23b is connected, via second arc surface 26, to a second inclination inner peripheral surface 24d slightly depressed in an arc shape toward second inclination section 24.

Effects of Second Embodiment

According to the second embodiment, inner peripheral surfaces 22a of tubular section 22, first inclination inner peripheral surfaces 23b of first inclination sections 23, and second inclination inner peripheral surfaces 24d of second inclination sections 24 curvilinearly change as going in the axial direction. This downsizes a bulge of each second arc surface 26 that is a point of change in inclination angle between first inclination inner peripheral surface 23b and second inclination inner peripheral surface 24d. This mitigates concentration of stress on second arc surfaces 26 in response to contact with second rack tooth 20B due to input from a road surface, and thereby reduces damage on second arc surfaces 26.

The following exemplifies conceivable aspects of a steering device according to the embodiments described above.

According to one aspect, a steering device includes: a steering shaft structured to receive rotational force; a rack bar in engagement with the steering shaft; and a rack housing that is made of a metal and contains the rack bar such that the rack bar is movable, wherein: the rack housing includes a tubular section extending in a movable direction of the rack bar, and includes a first inclination section disposed in an axial end of the tubular section and inclined to go away from the rack bar outwardly in a radial direction with respect to the rack bar; the tubular section is structured to contact with the rack bar in response to warping of the rack bar due to input from outside; and the first inclination section is structured to contact with the rack bar later than the tubular section in response to warping of the rack bar due to input from outside.

In addition to the above favorable aspect of the steering device, the rack housing includes a second inclination section connected to the first inclination section and inclined to go away from the rack bar outwardly in the radial direction with respect to the rack bar at an inclination angle greater than an inclination angle of the first inclination section; and the second inclination section is structured to contact with the rack bar in response to warping of the rack bar due to input from outside.

According to another favorable aspect, in addition to any one of the above aspects of the steering device, the rack bar includes rack teeth formed by forging in a circumferential region in an outer periphery of a cylindrical material within an axial range excluding an end of the cylindrical material; and the first inclination section is positioned to face one of the rack teeth.

According to still another favorable aspect, in addition to any one of the above aspects of the steering device, each of the rack teeth has a tooth width greater than a length of a line segment connecting two intersection points between an outer periphery of the end of the cylindrical material and a tooth top of the each of the rack teeth when viewed in the movable direction of the rack bar.

According to still another favorable aspect, in addition to any one of the above aspects of the steering device, each of the tubular section, the first inclination section, and the second inclination section is structured to contact with tooth-width-direction both ends of a corresponding one of the rack teeth, in response to warping of the rack bar due to input from outside.

According to still another favorable aspect, in addition to any one of the above aspects of the steering device, the rack bar is connected to a ball joint, and the rack housing includes a step section positioned adjacently to the second inclination section in the movable direction of the rack bar, and the step section includes a bottom surface structured as a regulation surface that regulates movement of the ball joint in the movable direction of the rack bar, and the bottom surface of the step section has a width in the radial direction with respect to the rack bar which is wider in a region excluding the second inclination section than in a region including the second inclination section.

According to still another favorable aspect, in addition to any one of the above aspects of the steering device, each of the tooth-width-direction both ends of the rack teeth includes an arc-shaped surface.

According to still another favorable aspect, in addition to any one of the above aspects of the steering device, the second inclination section is structured to contact with the rack bar later than the first inclination section in response to warping of the rack bar due to input from outside.

According to still another favorable aspect, in addition to any one of the above aspects of the steering device, the tubular section is connected to the first inclination section via a first arc surface having an arc-shaped surface, and the first inclination section is connected to the second inclination section via a second arc surface having an arc-shaped surface.

According to still another favorable aspect, in addition to any one of the above aspects of the steering device, the tubular section, the first inclination section, and the second inclination section change curvilinearly.

According to still another favorable aspect, in addition to any one of the above aspects of the steering device, the rack teeth have a pitch shorter than an axial width of the first inclination section in the movable direction of the rack bar.

According to still another favorable aspect, in addition to any one of the above aspects of the steering device, the pitch of the rack teeth is shorter than an axial width of the second inclination section in the movable direction of the rack bar.

According to still another favorable aspect, in addition to any one of the above aspects of the steering device, the rack bar is structured to contact with the second inclination section within an elastic deformation region of the rack bar.

According to still another favorable aspect, in addition to any one of the above aspects of the steering device, the rack bar is formed by die-casting, and the first inclination section has a cast surface.

The invention claimed is:

1. A steering device comprising:
a steering shaft structured to receive rotational force;
a rack bar in engagement with the steering shaft; and
a rack housing that is made of a metal and contains the rack bar such that the rack bar is movable,
wherein:
the rack housing includes a tubular section extending in a movable direction of the rack bar, and includes a first inclination section disposed in an axial end of the tubular section and inclined to go away from the rack bar outwardly in a radial direction with respect to the rack bar;
the tubular section is structured to contact with the rack bar in response to warping of the rack bar due to input from outside; and
the first inclination section is structured to contact with the rack bar later than the tubular section in response to warping of the rack bar due to input from outside,
wherein:
the rack housing includes a second inclination section connected to the first inclination section and inclined to go away from the rack bar outwardly in the radial direction with respect to the rack bar at an inclination angle greater than an inclination angle of the first inclination section; and
the second inclination section is structured to contact with the rack bar in response to warping of the rack bar due to input from outside.

2. The steering device as claimed in claim 1, wherein:
the rack bar includes rack teeth formed by forging in a circumferential region in an outer periphery of a cylindrical material within an axial range excluding an end of the cylindrical material; and
the first inclination section is positioned to face one of the rack teeth.

3. The steering device as claimed in claim 2, wherein each of the rack teeth has a tooth width greater than a length of a line segment connecting two intersection points between an outer periphery of the end of the cylindrical material and a tooth top of the each of the rack teeth when viewed in the movable direction of the rack bar.

4. The steering device as claimed in claim 2, wherein each of the tubular section, the first inclination section, and the second inclination section is structured to contact with tooth-width-direction both ends of a corresponding one of the rack teeth, in response to warping of the rack bar due to input from outside.

5. The steering device as claimed in claim 4, wherein:
the rack bar is connected to a ball joint;
the rack housing includes a step section positioned adjacently to the second inclination section in the movable direction of the rack bar;
the step section includes a bottom surface structured as a regulation surface that regulates movement of the ball joint in the movable direction of the rack bar; and
the bottom surface of the step section has a width in the radial direction with respect to the rack bar which is wider in a region excluding the second inclination section than in a region including the second inclination section.

6. The steering device as claimed in claim 4, wherein each of the tooth-width-direction both ends of the rack teeth includes an arc-shaped surface.

7. The steering device as claimed in claim 2, wherein the second inclination section is structured to contact with the rack bar later than the first inclination section in response to warping of the rack bar due to input from outside.

8. The steering device as claimed in claim 7, wherein:
the tubular section is connected to the first inclination section via a first arc surface having an arc-shaped surface; and
the first inclination section is connected to the second inclination section via a second arc surface having an arc-shaped surface.

9. The steering device as claimed in claim 2, wherein the tubular section, the first inclination section, and the second inclination section change curvilinearly.

10. The steering device as claimed in claim 2, wherein the rack teeth have a pitch shorter than an axial width of the first inclination section in the movable direction of the rack bar.

11. The steering device as claimed in claim 10, wherein the pitch of the rack teeth is shorter than an axial width of the second inclination section in the movable direction of the rack bar.

12. The steering device as claimed in claim 2, wherein the rack bar is structured to contact with the second inclination section within an elastic deformation region of the rack bar.

13. The steering device as claimed in claim 1, wherein:
the rack bar is formed by die-casting; and
the first inclination section has a cast surface.

* * * * *